United States Patent Office 2,995,474

Patented Aug. 8, 1961

2,995,474

PHOTOCONDUCTIVE CADMIUM SULFIDE AND METHOD OF PREPARATION THEREOF

Donald Pearlman, Rochester, N.Y., assignor to Eastman Kodak Company, Rochester, N.Y., a corporation of New Jersey No Drawing. Filed Oct. 2, 1959, Ser. No. 843,927
11 Claims. (Cl. 117—211)

This invention concerns the synthesis of photoconductive cadmium sulfide powders with improved properties.

Photoconductive elements are prepared from materials which display a reduced resistance to electric current flow when irradiated with light. Such photoconductive elements can be prepared from photoconductive powders in many ways. Essentially two conducting electrodes are connected to the photoconductive powder under such conditions that the powder can be irradiated by actinic radiation. Thus, the powder can be coated over two conducting metal electrodes which are separated by a small gap. The powder also may be sandwiched between a conducting metal which serves as one electrode and a thin conducting metal, transparent to the actinic radiation, which serves as the other electrode. Where light is the actinic radiation, this transparent or semi-transparent conducting electrode may be a layer of evaporated metal or electrically conducting glass. If X-rays, $\gamma$-rays or other penetrating radiation is used, the transparent electrode need not be transparent to light.

Upon simultaneous application of voltage and of light, a current is produced which is modulated by the intensity of light. This characteristic may be used for photographic purposes.

Among the materials which have been found to be useful for photoconductivity are crystals and powders of cadmium sulfide. For instance, large single crystals of cadmium sulfide which have high conductivity have been prepared by R. Frerichs (Phys. Rev., vol. 72, 594 (1947)), by reacting cadmium vapor with gaseous hydrogen sulfide.

Bube and Thomsen (J. Chem. & Phys., vol. 23, 15 (1955)), discuss the conductivity and photoconductivity of cadmium sulfide single crystals as obtained by the diffusion of copper or silver into single crystals of cadmium sulfide grown from the vapor in the presence of halide. Subsequently, Thomsen and Bube (Rev. of Sci. Inst., vol. 26, 664 (1955)), described high-sensitivity photoconductor powder layers and sintered layers in large-area form with most of the desirable characteristics of single crystals.

Large single photoconductive crystals which exhibit large photocurrents and high ratios of light current to dark current are relatively small in size. Consequently, the total current passed by a single crystal is small. Furthermore, photoconductive crystals are difficult to grow and are fragile. Thus, the expense of manufacture and maintenance often prohibits the use of single crystal photocells.

Another type of photoconducting layer which may be used is a sintered coating which can be prepared from cadmium sulfide with cadmium chloride and copper chloride added. This mixture may be coated on a support such as a borosilicate glass plate to a desired thickness and then dried. The glass plate bearing a powdered coating is fired at 600° C. for about 5 minutes in a restricted volume of air and then cooled. However, this type of preparation is not suited for certain electroconductive supports such as certain papers and the like, which would be destroyed during the sintering treatment.

Another type of photoconductive device comprises a body including finely divided photoconducting powder particles. For instance, the body may contain an unbonded photoconducting powder or a powder mixed with a binder such as a synthetic resin. These powders exhibit a broader band of spectral response than single crystal photocells and, in addition, may be prepared in any desired size, shape or current-carrying capacity. However, in the past, these powder-type devices have had relatively low photo-sensitivity and relatively high resistance when the device was irradiated with light to which it is sensitive.

There has been a need for a photoconductive device preferably in powder form which can be bonded with a resinous binder for coating on suitable substrates including electro-conducting glasses, conducting paper, unidimensionally conducting layers and the like. Ideally, such a powder should be a perfect insulator when light to which it is sensitive is absent, and a perfect conductor when a maximum intensity of light to which it is sensitive is present. It is also desirable that the response of the photoconductive material be proportional or even more than proportional to the amount of illumination which falls on the photoconductive layer. This property makes a material highly useful for electrophotographic purposes where it is necessary to distinguish between the intensity of illumination from one part of the area to another.

The standard manufacturing process of cadmium sulfide, selenide and telluride photoconductive cells for purposes of detection of light, as described by Gans in U.S. Patent No. 2,651,700, makes use of the thermal diffusion of suitably selected metallic impurities called activators into the crystal lattice by firing the intimate mixture of heat-crystallized cadmium sulfide and of suitable salts of the activator in air. Such techniques are well known in the phosphor art and it is necessary first to prepare the moderately large crystallities by a preliminary heatting process. Since it is difficult to do this, Gans first prepares the crystallites of a smaller size than would be required in a detecting cell, then grinds these to less than 5 microns, compresses the resultant powder under high pressures, and fires this preformed material in air.

My photoconductive powder is prepared in one step as a very fine powder. Moreover, the firing atmosphere is not inert and the resulting powder has a superior sensitivity to light as indicated by a linear electrical conductivity response during illumination.

One object of this invention is to produce a photoconductive powder which is fine-grained and easily dispersed in organic binders. Another object is to provide a photoconductive powder which can be coated directly on flexible or rigid heat-sensitive supports to yield an area of photoconductor which is more sensitive than the prior-known photoconductors. A further object is to provide photoconductive layers having a linear or more than linear response with relatively high photosensitivities. An additional object is to provide a method of synthesizing photoconductive cadmium sulfide powders.

In achieving the above objects, I obtain a photoconductive cadmium sulfide by firing purified, precipitated luminescent pure cadmium sulfide, dosed with 20 to 300 parts per million (p.p.m.) copper chloride based on the weight of cadmium sulfide for a period of 20 minutes to one hour at 500 to 800° C. in an atmosphere which is composed of $H_2$, $H_2S$ and HCl. The atmosphere is selected by choosing a ratio of $H_2$:$H_2S$ which will keep the dissociation pressure of cadmium arising from the cadmium sulfide at from $10^{-1}$ to $10^{-5}$ atmosphere, while the $H_2$:HCl ratio is kept at from 100:1 to 1:1 by volume. No flux is used.

In my preferred embodiment, pure luminescent grade cadmium sulfide which has been dosed with 100 p.p.m. of $CuCl_2$ is fired for 20 minutes at 700° C. in an atmosphere which consists of $H_2$, $H_2S$ and HCl. The ratio of $H_2$:$H_2S$ is chosen so that the dissociation pressure of cadmium arising from the cadmium sulfide is kept at about $10^{-3}$ atmosphere, while the ratio of $H_2$:HCl is about 30:1.

The following examples are intended to illustrate my invention and are not intended to limit it in any way:

EXAMPLE 1

A 100-gram sample of cadmium sulfide dosed with 100 p.p.m. of $CuCl_2$ contained in a quartz boat was inserted into a quartz firing tube, about 30 inches long, 2 inches in diameter, in an atmosphere obtained by passing into the firing tube $H_2S$ at a rate of 2–2.5 cc. per minute as determined by a flowmeter, and $H_2$ which contains 3–3.5 percent HCl at a rate of 800–900 cc. per minute and fired at a temperature of 700° C. The product of the firing was cooled to room temperature in the firing atmosphere after being fired for 20 minutes.

The powders were fine-grained and easily dispersed in organic binders. The powder was coated in a binder of silicone alkyd resin in a 3:1 solids ratio basis at a wet thickness of 0.003-inch on electrically conducting glass after which the layer was dried and an electrode of colloidal graphite was coated forming an electrode approximately 1-cm. square on the photoconductive layer.

The following Table I gives the resulting photoconductivity. $I_d$ is the dark current, $I_1$ the photocurrent in microamperes obtained on illumination by one foot-candle of tungsten, and $I_{20}$ the photocurrent obtained by 20 foot-candles of tungsten.

*Table I*

| Applied Voltage | $I_d$ | $I_1$ | $I_{20}$ |
|---|---|---|---|
| 12 | 0.003 | 29 | 2400 |
| 22½ | .024 | 1000 | 36,000 |
| 34½ | .09 | 6000 | 50,000 |
| 45 | .25 | 12,000 | ---------- |
| 57 | .8 | 16,000 | ---------- |

EXAMPLE 2

Using the same conditions as in Example 1 except that the temperature was maintained at 800° C., cadmium sulfide photoconductors were prepared. A suspension consisting of 10 g. of photoconductive cadmium sulfide to 20 cc. of 12 percent ethyl cellulose solution in a 4:1 toluene-ethanol solvent solution was coated 0.004-inch wet thickness on the electrically conducting glass. The currents shown in the following Table II were obtained on illumination with 20 foot-candles at an applied field of 22½ volts. The electrically conducted glass was used as one electrode and another electrode was obtained by applying approximately 1-cm. square of colloidal graphite on the cadmium sulfide layer.

*Table II*

| pCd | $HCl/H_2$ | D, μa. | L, μa. |
|---|---|---|---|
| $10^{-5}$ | 0.01 | 0.01 | 32 |
| $10^{-5}$ | 0.1 | 0.01 | 60 |
| $10^{-5}$ | 1.0 | 0.25 | 1180 |
| $10^{-3}$ | 0.01 | 0.15 | 60 |
| $10^{-3}$ | 0.1 | 1.7 | 1800 |
| $10^{-3}$ | 1.0 | 1500 | 44,000 |
| $10^{-1}$ | 0.01 | 15.0 | 2200 |
| $10^{-1}$ | 0.1 | 4000 | 50,000 |
| $10^{-1}$ | 1.0 | 20,000 | 50,000 |

In the above table, pCd is the partial pressure of cadmium vapor, $HCl/H_2$ the ratio of HCl to $H_2$ used to define the partial pressure of the hydrogen chloride, D, μa. the dark current and L, μa. the photocurrent, both measured in microamperes.

A commercially available photoconductive cadmium sulfide powder was obtained and found to consist of about 5–15 microns. Since the resistance of cadmium sulfide powder layers is dependent on the thickness of the layers, two methods of comparing different powders can be used, one using the same physical thickness coatings while the other method employs thicknesses having the same optical density.

Cadmium sulfide powder prepared according to my invention has a particle size of less than 1 micron while the commercially available powder had an average particle size greater than 10 microns. When the electrical properties were compared for approximately the same thickness coating, it was found that the commercially available powder had quite a flat response showing that the current output is affected very little by the illumination. While this type of response is highly desirable for detection of illumination, it is not suitable for photographic purposes.

On the other hand, the response of layers prepared from my material is much steeper, showing that the photocurrent output is proportional or more than proportional to the intensity of illumination. This property makes my material highly useful for electrophotographic purposes where it is necessary to distinguish between the intensity of illumination from one part of the area to another.

In comparing two coatings having the same optical density, a similar difference in reduced degree was also detected.

The substrates for coating my photoconductors may be any transparent conducting layer. Among these are electrically conducting glasses such as electrically conducting borosilicate glass. Thin layers of evaporated metal on any rigid or flexible transparent support may also be used.

In addition to ethyl cellulose and silicone alkyd resins, other resinous materials which may be used are polystyrene, butyl acrylate, polyvinyl acetate, styrene-butadiene copolymers, styrene-acrylonitrile copolymers, protein coatings such as gelatin, casein and the like, etc. These photoconductive layers can be prepared in ratios of from one part binder to one part photoconductor to a ratio of 10 parts binder to one part photoconductor. The actual coating thickness depends on the characteristics of the particular photoconducting material; therefore, the thickness is better determined as a measure of the optical density which may vary from 0.4 to about 2.0

The term "luminescent grade" refers to materials of very high purity suitable for use in luminescent materials. H. W. Leverenz, "Luminescence of Solids," Wiley and Sons, New York (1950), page 61, defines chemically pure (C.P.) substances as 99.9% pure; spectroscopically pure (S.P.) substances as 99.999% pure; and luminescence pure (L.P.) substances as 99.9999% pure.

The hydrogen halides useful in the process include HCl, HBr and HI. Hydrogen chloride is the preferred species.

Hydrogen selenide may be substituted for hydrogen sulfide and cadmium selenide substituted for cadmium sulfide.

Those skilled in the art will recognize that silver salts or other copper salts may be used in place of copper chloride. A salt of silver or copper is required which will diffuse through the cadmium composition during the firing. The anion should be a salt that will (*a*) diffuse satisfactorily in the CdS, (*b*) not poison the composition, (*c*) not have any other adverse effect, physical or chemical e.g., excessive darkening. Representative anions are: $NO_3^-$, $SO_4^=$, $SO_3^=$, $Cl^-$, $Br^-$, or the like.

I claim:

1. A method for preparing photoconductive cadmium sulfide comprising firing precipitated luminescent grade cadmium sulfide, containing 10–150 p.p.m. copper in the form of a copper salt for a period of 20–60 minutes at 500–800° C. in an atmosphere composed of hydrogen, hydrogen sulfide, and hydrogen chloride so chosen that the ratio of hydrogen to hydrogen sulfide keeps the dissociation pressure of cadmium arising from the cadmium sulfide at from $10^{-1}$ to $10^{-5}$ atmosphere and the ratio of hydrogen to hydrogen chloride varies from 100:1 to 1:1 by volume.

2. A photoconductive element comprising an electrically conducting support having coated thereon a photoconductive cadmium sulfide obtained by firing precipitated luminescent grade cadmium sulfide containing 10–150 p.p.m. copper in the form of a copper salt for a period of 20–60 minutes at 500–800° C. in an atmosphere which is composed of hydrogen, hydrogen sulfide and hydrogen chloride chosen so that the ratio of hydrogen to hydrogen sulfide keeps the dissociation pressure of cadmium arising from the cadmium sulfide at from $10^{-1}$ to $10^{-5}$ atmosphere and the ratio of hydrogen to hydrogen chloride varies from 100:1 to 1:1 by volume.

3. A method for preparing a photoconductive cadmium salt comprising firing a precipitated luminescent grade cadmium salt selected from the group consisting of cadmium selenide and cadmium sulfide, containing 10–150 p.p.m. of a salt selected from the class consisting of silver salts and copper salts for a period of 20–60 minutes at 500–800° C. in an atmosphere composed of hydrogen, a gas selected from the class consisting of hydrogen selenide and hydrogen sulfide, and hydrogen halide, said atmosphere chosen so that the ratio of hydrogen to the said gas keeps the dissociation pressure of cadmium arising from the cadmium salt at from $10^{-1}$ to $10^{-5}$ atmosphere and the ratio of hydrogen to hydrogen halide varies from 100:1 to 1:1 by volume.

4. A method for preparing photoconductive cadmium selenide comprising firing precipitated luminescent grade cadmium selenide, containing 10–150 p.p.m. silver in the form of a silver salt for a period of 20–60 minutes at 500–800° C. in an atmosphere composed of hydrogen, hydrogen selenide, and hydrogen bromide so chosen that the ratio of hydrogen to hydrogen selenide keeps the dissociation pressure of cadmium arising from the cadmium selenide at from $10^{-1}$ to $10^{-5}$ atmosphere and the ratio of hydrogen to hydrogen bromide varies from 100:1 to 1:1 by volume.

5. A method for preparing photoconductive cadmium sulfide comprising firing precipitated luminescent grade cadmium sulfide, containing 10–150 p.p.m. silver as a suitable silver salt, for a period of 20–60 minutes at 500–800° C. in an atmosphere composed of hydrogen, hydrogen sulfide, and hydrogen chloride so chosen that the ratio of hydrogen to hydrogen sulfide keeps the dissociation pressure of cadmium arising from the cadmium sulfide at from $10^{-1}$ to $10^{-5}$ atmosphere and the ratio of hydrogen to hydrogen chloride varies from 100:1 to 1:1 by volume.

6. A photoconductive element comprising an electrically conducting support having coated thereon a photoconductive cadmium salt obtained by firing a precipitated luminescent grade cadmium salt selected from the group consisting of cadmium selenide and cadmium sulfide containing 10–150 p.p.m. of a salt selected from the class consisting of silver salts and copper salts for a period of 20–60 minutes at 500–800° C. in an atmosphere which is composed of hydrogen, a gas selected from the class consisting of hydrogen selenide and hydrogen sulfide and hydrogen halide, said atmosphere chosen so that the ratio of hydrogen to the said gas keeps the dissociation pressure of cadmium arising from the cadmium salt at from $10^{-1}$ to $10^{-5}$ atmosphere and the ratio of hydrogen to hydrogen halide varies from 100:1 to 1:1 by volume.

7. A photoconductive element comprising an electrically conducting support having coated thereon a photoconductive cadmium selenide obtained by firing precipitated luminescent grade cadmium selenide containing 10–150 p.p.m. silver as a suitable silver salt for a period of 20–60 minutes at 500–800° C. in an atmosphere which is composed of hydrogen, hydrogen selenide and hydrogen bromide said atmosphere chosen so that the ratio of hydrogen to hydrogen selenide keeps the dissociation pressure of cadmium arising from the cadmium selenide at from $10^{-1}$ to $10^{-5}$ atmosphere and the ratio of hydrogen to hydrogen bromide varies from 100:1 to 1:1 by volume.

8. A photoconductive element comprising an electrically conducting support having coated thereon a photoconductive cadmium sulfide obtained by firing precipitated luminescent grade cadmium sulfide containing 10–150 p.p.m. Ag as a suitable Ag salt for a period of 20–60 minutes at 500–800° C. in an atmosphere which is composed of hydrogen, hydrogen sulfide and hydrogen chloride chosen so that the ratio of hydrogen to hydrogen sulfide keeps the dissociation pressure of cadmium arising from the cadmium sulfide at from $10^{-1}$ to $10^{-5}$ atmosphere and the ratio of hydrogen to hydrogen chloride varies from 100:1 to 1:1 by volume.

9. A photoconductive salt obtained by firing a precipitated luminescent grade salt selected from the group consisting of cadmium selenide and cadmium sulfide containing 10–150 p.p.m. of a salt selected from the class consisting of silver salts and copper salts, for a period of 20–60 minutes at 500–800° C. in an atmosphere composed of hydrogen, a gas selected from the class consisting of hydrogen selenide and hydrogen sulfide, and hydrogen halide so chosen that the ratio of hydrogen to said gas keeps the dissociation pressure of cadmium arising from the cadmium salt at from $10^{-1}$ to $10^{-5}$ atmosphere and the ratio of hydrogen to hydrogen halide various from 100:1 to 1:1 by volume.

10. A photoconductive cadmium sulfide obtained by firing precipitated luminescent grade cadmium sulfide containing 10–150 p.p.m. copper in the form of a copper salt, for a period of 20–60 minutes at 500–800° C. in an atmosphere which is composed of hydrogen, hydrogen sulfide, and hydrogen chloride chosen so that the ratio of hydrogen to hydrogen sufide keeps the dissociation pressure of cadmium arising from the cadmium sulfide at from $10^{-1}$ to $10^{-5}$ atmosphere and the ratio of hydrogen to hydrogen chloride varies from 100:1 to 1:1 by volume.

11. A photoconductive cadmium selenide obtained by firing precipitated luminescent grade cadmium selenide containing 10–150 p.p.m. copper in the form of a copper salt, for a period of 20–60 minutes at 500–800° C. in an atmosphere which is composed of hydrogen, hydrogen sulfide, and hydrogen chloride chosen so that the ratio of hydrogen to hydrogen sulfide keeps the dissociation pressure of cadmium arising from the cadmium selenide at from $10^{-1}$ to $10^{-5}$ atmosphere and the ratio of hydrogen to hydrogen chloride varies from 100:1 to 1:1 by volume.

References Cited in the file of this patent

UNITED STATES PATENTS

| | | |
|---|---|---|
| 2,843,914 | Koury | July 22, 1958 |
| 2,866,878 | Briggs et al. | Dec. 30, 1958 |
| 2,876,202 | Busanovich et al. | Mar. 3, 1959 |
| 2,879,182 | Pakswer et al. | Mar. 24, 1959 |
| 2,879,505 | Kazan | Mar. 24, 1959 |